US009790667B2

United States Patent
Du et al.

(10) Patent No.: US 9,790,667 B2
(45) Date of Patent: Oct. 17, 2017

(54) PUSH-ACTIVATED TUB SPOUT

(71) Applicant: Masco Canada Liimited, St. Thomas (CA)

(72) Inventors: Xan Vy Du, London (CA); Frank Stauder, London (CA); Alyson Brhelle, London (CA); Bryan Fisher, Appin (CA)

(73) Assignee: Masco Canada Limited, St. Thomas (CA)

( * ) Notice: Subject to any disclaimer, the term of this patent is extended or adjusted under 35 U.S.C. 154(b) by 0 days.

(21) Appl. No.: 15/097,714

(22) Filed: Apr. 13, 2016

(65) Prior Publication Data

US 2016/0305100 A1    Oct. 20, 2016

Related U.S. Application Data

(60) Provisional application No. 62/147,802, filed on Apr. 15, 2015.

(51) Int. Cl.
    *E03C 1/04*    (2006.01)
    *F16K 3/02*    (2006.01)

(52) U.S. Cl.
    CPC .......... *E03C 1/0404* (2013.01); *F16K 3/0254* (2013.01)

(58) Field of Classification Search
    CPC .................................... E03C 1/0404
    USPC ...................................... 4/675–678
    See application file for complete search history.

(56) References Cited

U.S. PATENT DOCUMENTS

| | | | | |
|---|---|---|---|---|
| 3,473,558 A * | 10/1969 | Mongerson | ............. | F16K 19/00 137/119.03 |
| 4,117,858 A * | 10/1978 | Bucknell | ................. | F16K 19/00 137/359 |
| 4,606,370 A * | 8/1986 | Geipel | ................ | F16K 11/0445 137/119.05 |
| 5,279,005 A * | 1/1994 | Valley | ..................... | E03C 1/042 137/467 |
| 5,893,387 A * | 4/1999 | Paterson | ............... | E03C 1/0401 137/359 |
| 6,009,904 A * | 1/2000 | Yang | ..................... | E03C 1/0404 137/119.05 |
| 6,152,180 A * | 11/2000 | Yang | ..................... | E03C 1/0404 137/119.05 |
| 6,301,727 B1 * | 10/2001 | Bertrand | ................. | E03C 1/042 137/359 |
| 6,840,267 B1 * | 1/2005 | Jennings | ................. | E03C 1/042 137/360 |

(Continued)

*Primary Examiner* — Lori Baker
(74) *Attorney, Agent, or Firm* — Carlson, Gaskey & Olds, PC

(57) ABSTRACT

A tub spout with a diverter mechanism includes a housing having an external surface and an internal cavity that includes a spout outlet. A water supply conduit is located within the internal cavity and provides a fluid path that is in fluid communication with the spout outlet. A push button extends outwardly of the external surface of the housing and is movable relative to the housing between a non-diverting position where water exits the spout outlet and a diverting position where water is prevented from exiting the spout outlet. A diverter gate is positioned within the internal cavity to selectively block the fluid path and is coupled for movement with the push button. A resilient member biases the push button to the non-diverting position.

20 Claims, 5 Drawing Sheets

(56) References Cited

U.S. PATENT DOCUMENTS

| | | | |
|---|---|---|---|
| 6,925,662 B1 * | 8/2005 | Tan | E03C 1/0404 137/801 |
| 7,082,626 B2 * | 8/2006 | Williams | E03C 1/04 137/119.05 |
| 7,258,322 B1 * | 8/2007 | Yang | E03C 1/0404 137/801 |
| 7,373,674 B1 * | 5/2008 | Condon | E03C 1/042 285/902 |
| 7,793,365 B2 * | 9/2010 | Miura | E03C 1/0403 137/360 |
| 7,857,286 B1 * | 12/2010 | Huang | E03C 1/023 137/119.05 |
| 8,176,580 B2 | 5/2012 | Kajuch et al. | |
| 8,214,941 B2 * | 7/2012 | Furseth | E03C 1/042 4/675 |
| 8,376,249 B2 * | 2/2013 | Huang | E03C 1/0404 137/801 |
| 8,464,369 B2 | 6/2013 | Furseth | |
| 8,566,975 B1 * | 10/2013 | Lin | F16K 3/0218 137/801 |
| 8,763,624 B1 * | 7/2014 | Huang | E03C 1/0404 137/119.05 |
| 2009/0019636 A1 * | 1/2009 | Kajuch | E03C 1/04 4/678 |

* cited by examiner

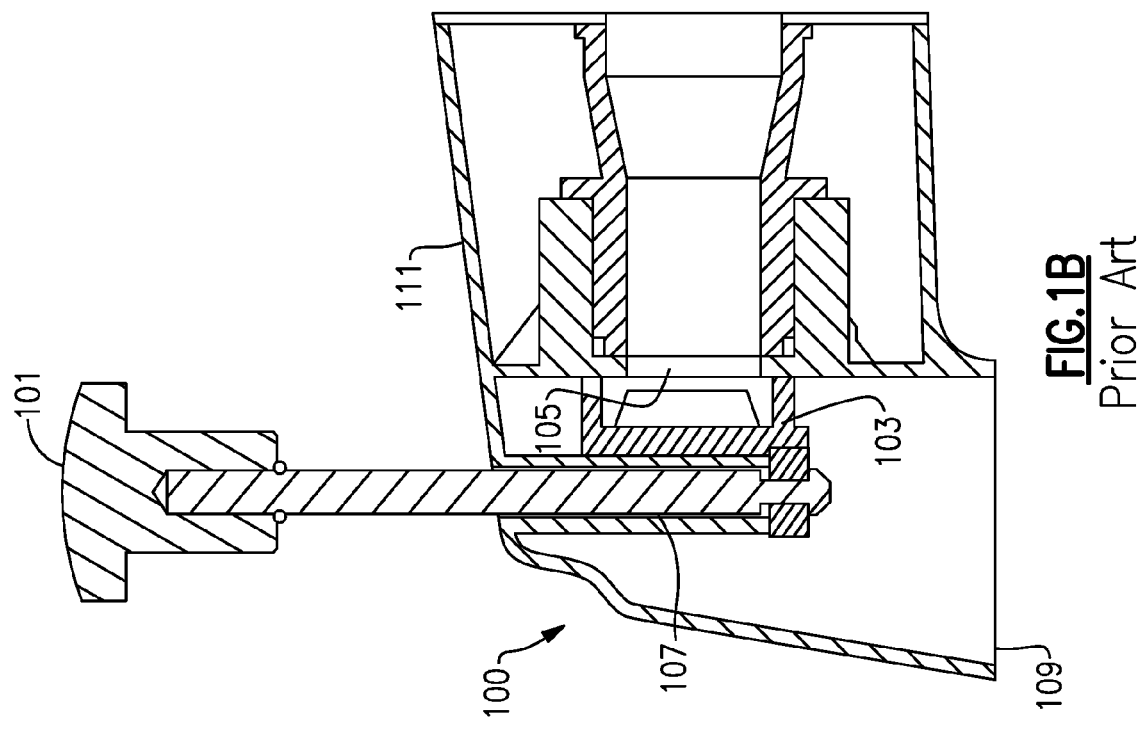
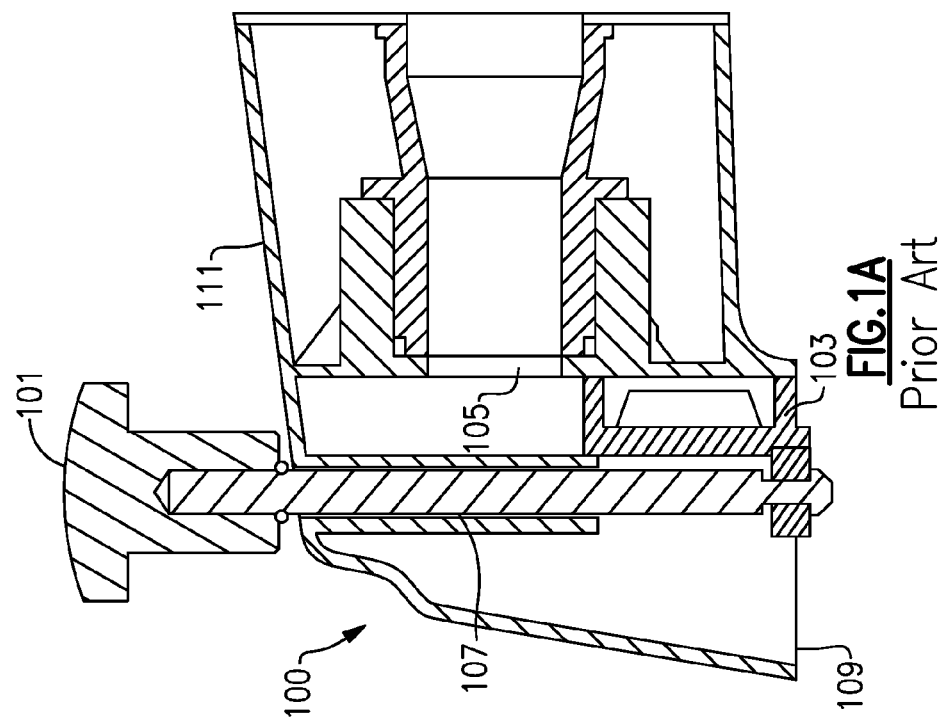

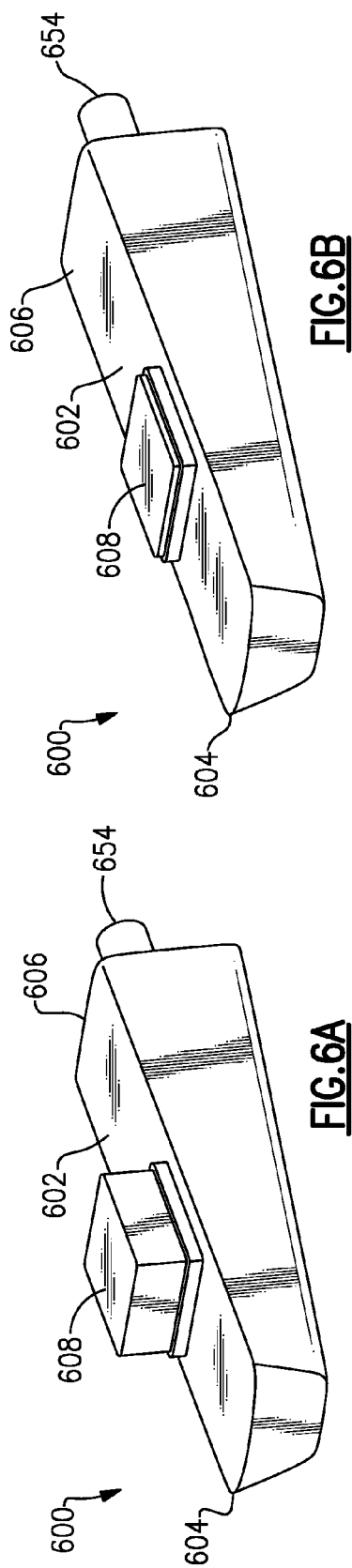
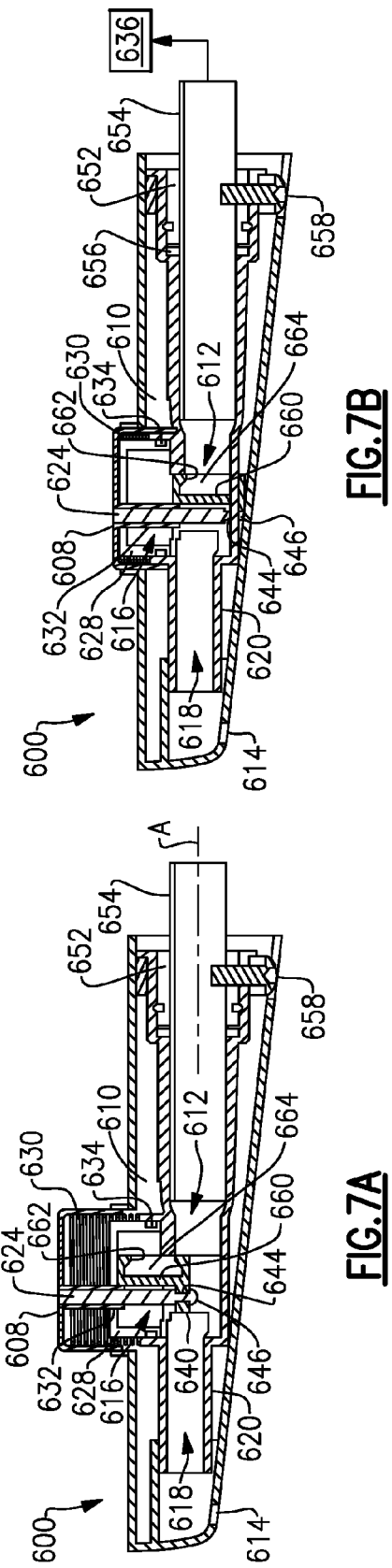

PUSH-ACTIVATED TUB SPOUT

TECHNICAL FIELD

The present disclosure relates generally to tub spout and water diverting mechanism, and more particularly to a push-activated water diverting mechanism.

BACKGROUND

Standard tub spouts utilize a pull-up or pull-down diverter mechanism that requires the user to pull on a knob to divert a water supply exiting the tub spout to another outlet, such as a showerhead for example. Standard tub spouts with vertically moving diverter gates position the diverter gate at least partially below the water supply in the non-diverting position, and when the knob is pulled upwardly, the diverter gate is pulled upwardly to block the water supply from exiting the tub spout.

The knobs provided in these pull-up and pull-down diverter mechanisms are relatively small in size and can be difficult to grasp. Further, the grasping motion required to pull on the knob can be difficult in accessible design (handicap) environments. Thus, a more accessible design that can be easily actuated is desirable.

SUMMARY

In one exemplary embodiment, a tub spout with a diverter mechanism includes a housing having an external surface and an internal cavity that includes a spout outlet. A water supply conduit is located within the internal cavity and provides a fluid path that is in fluid communication with the spout outlet. A push button extends outwardly of the external surface of the housing and is movable relative to the housing between a non-diverting position where water exits the spout outlet and a diverting position where water is prevented from exiting the spout outlet. A diverter gate is positioned within the internal cavity to selectively block the fluid path and is coupled for movement with the push button. A resilient member biases the push button to the non-diverting position.

In another embodiment according to the previous embodiment, the diverter gate is positioned at least partially vertically above the fluid path of the water supply conduit when in the non-diverting position.

In another embodiment according to any of the previous embodiments, the diverter gate is connected to a rod that is fixed for movement with the push button.

In another embodiment according to any of the previous embodiments, the resilient member comprises a spring that surrounds the rod, and when a downward force is applied to the push button, the spring is compressed and the rod moves downward to lower the diverter gate to block the fluid path of the water supply conduit.

In another embodiment according to any of the previous embodiments, when the push button is in the diverting position and a water supply is turned on, the fluid path of the water supply conduit remains sealed due to a force of water pressure on the diverter gate, and when the water supply is shut off, the force due to water pressure on the diverter gate falls below a force attributed to the spring and the push button is reset to the non-diverting position.

In another embodiment according to any of the previous embodiments, a rod mount portion surrounds the rod and is held fixed relative to the housing, and wherein the rod extends from the push button to a distal end that extends outwardly of the rod mount portion and is coupled to the diverter gate.

In another embodiment according to any of the previous embodiments, the rod mount portion is integral with or fixed directly to the housing.

In another embodiment according to any of the previous embodiments, a mounting boss within the internal cavity receives a downstream end of the supply conduit, and the diverter gate is positioned axially between the rod mount portion and the mounting boss.

In another embodiment according to any of the previous embodiments, a cap is held fixed to the water supply conduit, and the rod mount portion is integrally formed with or fixed directly to the cap.

In another embodiment according to any of the previous embodiments, the supply conduit includes a mounting boss that includes an opening to receive the cap, and wherein the resilient member comprises a spring that reacts between the push button and the mounting boss.

BRIEF DESCRIPTION OF THE DRAWINGS

FIG. 1A is a cross-sectional view of a tub spout with a water diverting mechanism according to the prior art, wherein the water diverting mechanism is in a non-diverting position.

FIG. 1B is a view similar to FIG. 1a but showing the water diverting mechanism in a diverting position.

FIG. 6A is a perspective view of another example configuration of the disclosed invention having a centrally located button on a housing body where the button is protruding in the non-diverting position.

FIG. 6B is a view similar to FIG. 6A but showing that the button is substantially flush with the housing in the diverting position.

FIG. 7A is a side section view of the embodiment shown in FIG. 6A in the non-diverting position.

FIG. 7B is a view similar to FIG. 7A but in the diverting position.

DETAILED DESCRIPTION

Figure 2A:
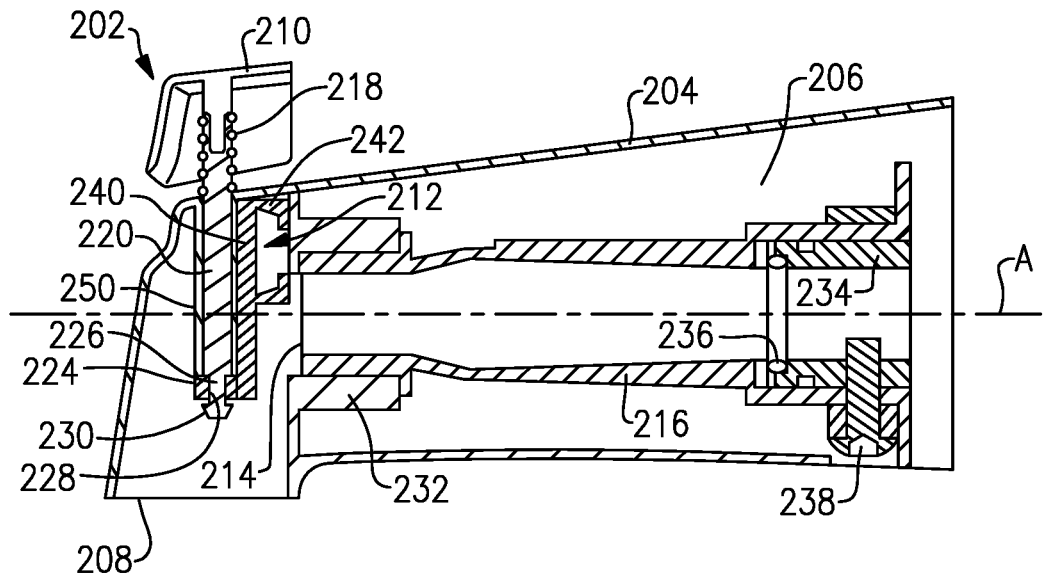
FIG. 2A is a cross-sectional view of one example embodiment of a tub spout with a water diverting mechanism according to the subject invention, wherein the water diverting mechanism is in the non-diverting position.

FIGS. 1A-1B schematically illustrate a tub spout 100 with a water diverting mechanism according to the prior art. FIG. 1A illustrates the tub spout 100 in the non-diverting position, and FIG. 1B illustrates the tub spout 100 in the diverting position. A knob 101 is used to move a diverter gate/seal assembly 103 to cover and uncover an internal water supply opening 105 within the spout 100. The knob 101 is connected to the diverter gate/seal assembly 103 by a vertically moveable rod 107. In the non-diverting position, the diverter gate/seal assembly 103 is arranged below the water supply opening 105. When a water supply to the spout 100 is turned on in the non-diverting position, water travels through the water supply opening 105 and out through a tub spout outlet 109.

To activate the diverting mechanism, a user grasps the knob 101 and provides an upward lifting force. The upward force moves the rod 107 and diverter gate/seal assembly 103 upward in a vertical direction relative to a housing 111 so that the diverter gate/seal assembly 103 completely covers the water supply opening 105. In this diverting position, the diverter gate/seal assembly 103 prevents water from flowing out of the water supply opening 105 to the tub spout outlet 109, and instead water is redirected to a second outlet (not shown). When the knob 101 is in the diverting position and the water supply is turned on, the force due to water pressure on the diverter gate/seal 103 provides sufficient force to keep the diverter gate/seal 103 in the diverting position. When the water supply for the system is shut off and/or the force due to water pressure falls below the force due to gravity, the system resets to the non-diverting position and the knob 101 returns to the position shown in FIG. 1A.

Figure 2B:
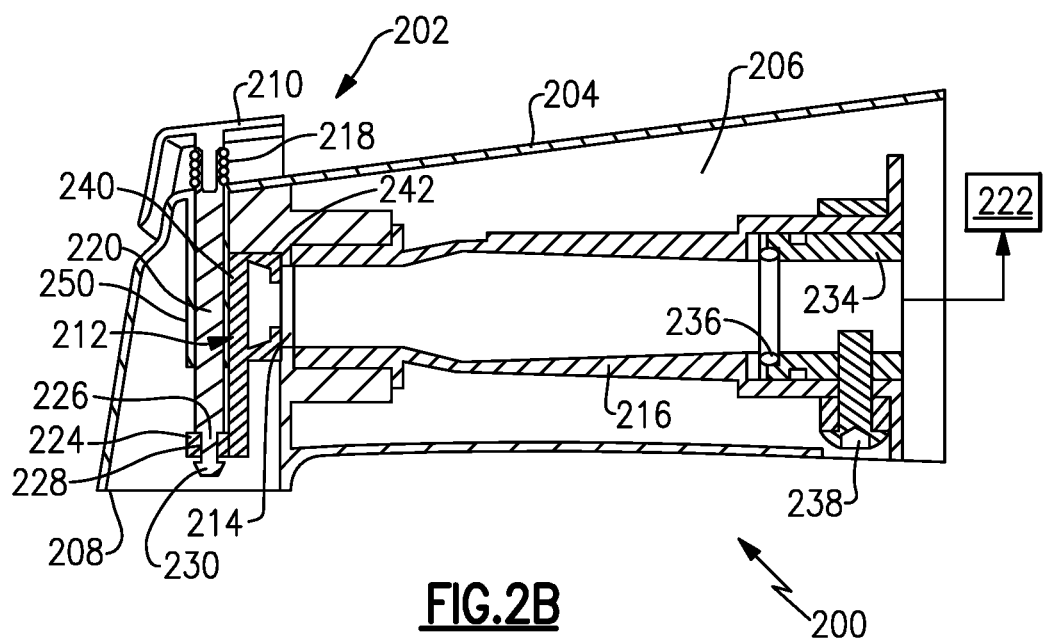
FIG. 2B is a view similar to FIG. 2A but showing the water diverting mechanism in the diverting position.

FIGS. 2A-2B illustrate a tub spout 200 that incorporates a diverting mechanism 202 of the present invention. FIG. 2A illustrates the diverting mechanism 202 in the non-diverting position, and FIG. 2B illustrates the diverting mechanism 202 in the diverting position. The tub spout 200 comprises a housing 204 having an external surface and which defines an internal cavity 206 with a spout outlet 208. The diverting mechanism 202 includes a push button 210 that is connected to a diverter gate/seal 212 positioned within the internal cavity 206. In the non-diverting position, the diverter gate/seal 212 is positioned at least partially above a water supply opening 214 from a supply conduit 216. The diverter gate/seal 212 is connected to a spring 218 and the push button 210 by a rod 220.

When a user applies a downward vertical force to the push button 210, the spring 218 is compressed and the rod 220 moves downward to lower the diverter gate/seal 212 to seal the water supply opening 214. When the water supply opening 214 is sealed, the diverting mechanism 202 is in a diverting position to prevent water from flowing through the tub spout outlet 208 and instead redirects water to a second outlet, such as to a showerhead for example, which is schematically illustrated at 222. When the diverting mechanism 202 is in the diverting position and the water supply for the system is turned on, the water supply opening 214 remains sealed due to the force of water pressure on the diverter gate/seal 212. When water supply for the system is shut off and the force due to water pressure on the diverter gate/seal 212 falls below the force attributed to the spring 218, the system resets to the non-diverting position. Drain holes can also be positioned below the button to prevent water pooling.

The diverter gate/seal 212 includes a tab 224 that extends outwardly to connect to the rod 220. The tab 224 can be integrally formed as one piece with the diverter gate/seal 212 or could be separately attached. In the example shown, the rod 220 includes a reduced neck portion 226 that is received within an opening 228 formed in the tab 224. A distal end 230 of the rod 220 has a larger section than the neck portion 226. When assembled, the distal end 230 of the rod 220 is pressed through the opening 228 which slightly expands and then retracts around the neck portion 226 in a snap fit.

The supply conduit 216 fits within a mounting boss 232 positioned within the internal cavity 206 of the housing 204. The mounting boss 232 has an opening that is aligned with the water supply opening 214 that is provided at the downstream end of the supply conduit 216. An additional internal pipe 234 is then inserted into an upstream end of the supply conduit 216. At least one seal 236 is installed between the internal pipe 234 and the supply conduit 216 to provide a sealed connection. A set screw 238 is then used to connect the housing 204 to the internal pipe 234.

The diverter gate/seal 212 comprises a gate portion 240 that extends along a substantial vertical length of the rod 220. The diverter gate/seal 212 includes a finial/seal portion 242 that is at the upper end of the gate portion 240. The tab 224 is at the lower end of the gate portion 240. The finial/seal portion 242 comprises a cup-shaped extension portion with an opening 244 that receives water when in the diverting position (FIG. 2B). When in the non-diverting position (FIG. 2A) the opening 244 is blocked by the mounting boss 232.

The supply conduit 216 defines a central axis A as shown in FIG. 2A. The cup-shaped extension portion of the diverter gate/seal 212 includes an upper portion and a lower portion. When the diverter gate/seal 212 is in the non-diverting position the lower portion is vertically above the central axis A to allow water to flow freely through the supply conduit 216 and to exit at the spout outlet 208.

The housing 204 includes an internal rod mount portion 250 through which the rod 220 is inserted. The rod mount portion 250 comprises a cylindrical tube that is spaced in a downstream direction from the mounting boss 232 that receives the supply conduit 216. The distal end 230 of the rod 220 extends outwardly of the rod mount portion 250 to connect to the tab 224 of the diverter gate/seal 212. The diverter gate/seal 212 moves vertically within an open area formed between the rod mount portion 250 and the mounting boss 232. When the button 210 is pushed down, the rod 220 moves down, the spring 218 is compressed and the opening 244 of the diverter gate/seal 212 is aligned with the water supply opening 214 as shown in FIG. 2B. The water pushes and holds/seals the finial/seal portion 242 of the diverter gate/seal 212 against the rod mount portion 250 when in the diverting position. When the water is turned off, the water pressure decreases and the force of the spring 218 returns the button 210 to the non-diverting position shown in FIG. 2A.

Figure 3A:
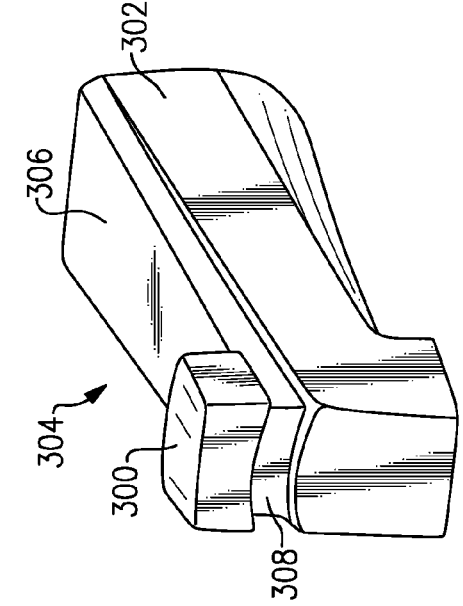
FIG. 3A is a perspective view of a housing of one example configuration of the disclosed invention with a protruding button in both the diverting and non-diverting positions, wherein the button of FIG. 3A is in the non-diverting position.
Figure 3B:
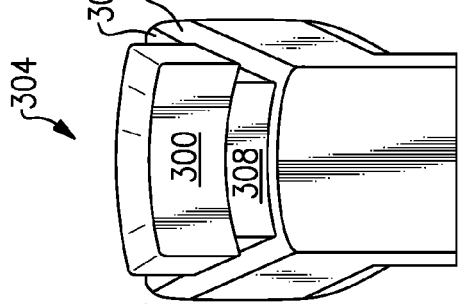
FIG. 3B is a front end view of the housing of FIG. 3A.
Figure 3C:
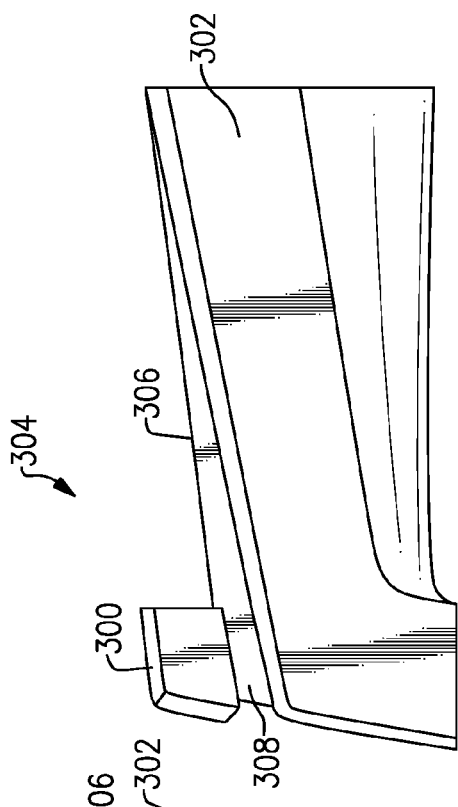
FIG. 3C is a side view of the housing of FIG. 3A.
Figure 3D:
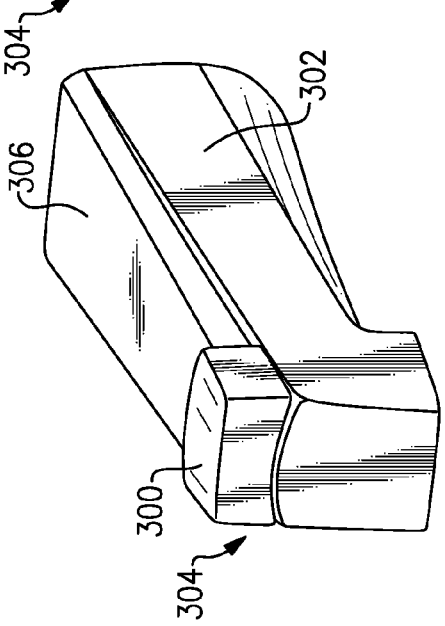
FIG. 3D is a view similar to FIG. 3A but showing the button in the diverting position.
Figure 3E:
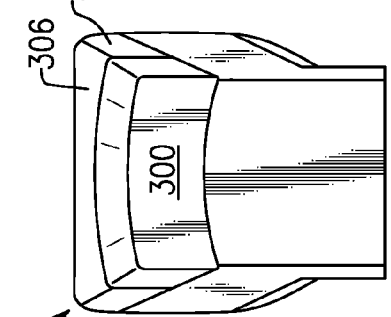
FIG. 3E is a view similar to FIG. 3B but showing the button in the diverting position.
Figure 3F:
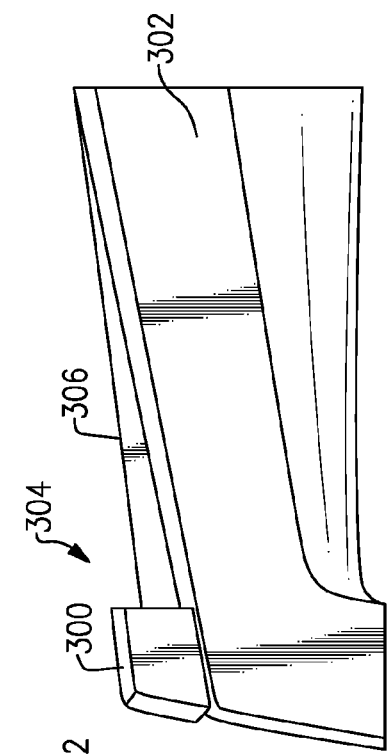
FIG. 3F is a view similar to FIG. 3C but showing the button in the diverting position.

FIGS. 3A-3F, 4A-B, and 5A-5B depict different embodiments of a tub spout utilizing the disclosed diverter mechanism. FIG. 3A depicts one example configuration where a push button 300 protrudes upwardly from a downstream end of a housing 302 of a tub spout 304. The housing 302 includes a tapering portion 306 that narrows in a direction toward the downstream end. As shown in FIG. 3B the button 300 is wider in a horizontal direction than the narrowed end 308 of the tapering portion 306. When in the non-diverting position (FIGS. 3A-3C), the button 300 is positioned vertically above the narrowed end 308. When in the diverting position (FIGS. 3D-3F), the button 300 is pressed down over the narrowed end 308 as best shown in FIG. 3E, but still protrudes upwardly from the housing 302 as best shown in FIG. 3F.

Figure 4A:
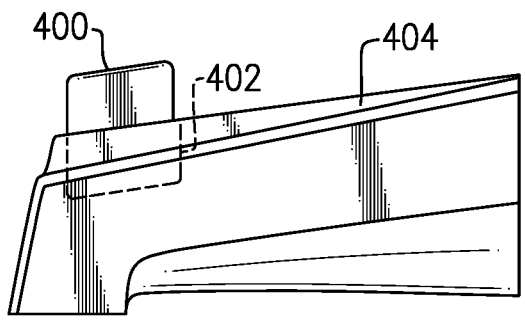
FIG. 4A is a side view of a housing of another example configuration of the disclosed invention wherein the button is protruding in the non-diverting position.
Figure 4B:
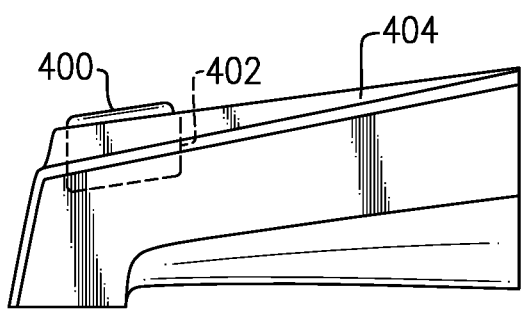
FIG. 4B is a view similar to FIG. 4A but showing that the button is substantially flush with the housing in the diverting position.

FIGS. 4A (non-diverting) and 4B (diverting) show another example configuration. In this example, a push button 400 lowers into a cavity (schematically indicated at 402) within a housing 404 when pressed into the diverting position to become substantially flush with the housing 404.

Figure 5A:
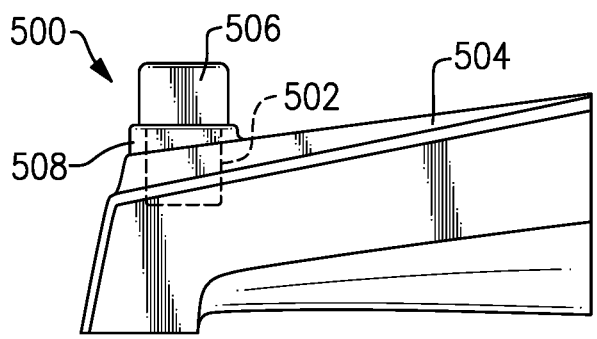
FIG. 5A is a side view of a housing of another example configuration of the disclosed invention having a tiered button with a first button portion protruding from a second button portion in the non-diverting position.
Figure 5B:
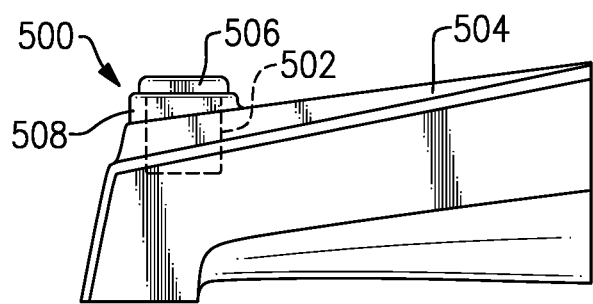
FIG. 5B is a view similar to FIG. 5A but showing that the first button portion is substantially flush with the second button portion in the diverting position.

FIGS. 5A (non-diverting) and 5B (diverting) show another example configuration with a tiered button. In this example, a push button 500 lowers into a cavity (schematically indicated at 502) within a housing 504 when pressed into the diverting position. The button 500 includes a first tier or first button portion 506 and a second tier or second button portion 508. The first button portion 506 is smaller than the second button portion 508 such that when pressed downwardly, the first button portion 506 recedes into the second button portion 508 to become substantially flush with the second button portion 508.

FIGS. 6A and 7A (non-diverting) and FIGS. 6B and 7B (diverting) show another example configuration. In this example, a spout 600 has a housing 602 that extends from an upstream end 604 to a downstream end 606, and a push button 608 lowers into a cavity 610 within the housing 602 when pressed into the diverting position to become substantially flush with the housing 602 as shown in FIG. 6B. In this example, the button 608 is centrally located on the housing 602 instead of being at the downstream end 606.

The tub spout 600 shows another example of a diverting mechanism 612 of the present invention that is used to control a water supply to a spout outlet 614. The diverting mechanism 612 includes a diverter gate/seal 616 that is positioned within the internal cavity 610 and which is connected to the push button 608. As with the previous embodiment, when in the non-diverting position, the diverter gate/seal 616 is positioned at least partially above a water supply opening 618 from a supply conduit 620. The diverter gate/seal 616 is connected to the push button 608 by a rod 624.

The supply conduit 620 includes an upwardly extending boss 626 that receives a cap 628 that extends into the button 608. A spring 630 reacts between an inner surface of the button 608 and the upper edge of the boss 626. The cap 628 has a cup-shaped body with an internal cylindrical rod mount 632 through which the rod 624 extends. The cap 628 is held fixed to the supply conduit 620 and includes a seal 634 to provide a sealed connection.

When a user applies a downward vertical force to the push button 608, the spring 630 is compressed against the supply conduit 620 and the rod 624 moves downward through the rod mount 632 to lower the diverter gate/seal 616 to seal the water supply opening 618. When the water supply opening 618 (FIG. 7B) is sealed, the diverting mechanism 612 is in a diverting position to prevent water from flowing through the tub spout outlet 614 and instead redirects water to a second outlet, such as to a showerhead for example, which is schematically illustrated at 636. When the diverting mechanism 612 is in the diverting position and the water supply for the system is turned on, the water supply opening 618 remains sealed due to the force of water pressure on the diverter gate/seal 616. When water supply for the system is shut off and the force due to water pressure on the diverter gate/seal 616 falls below the force attributed to the spring 630, the system resets to the non-diverting position.

The diverter gate/seal 616 includes a tab 640 that extends outwardly to connect to the rod 624. The tab 640 can be integrally formed as one piece with the diverter gate/seal 616 or could be separately attached. In the example shown, the rod 624 includes a reduced neck portion 642 that is received within an opening 644 formed in the tab 640. A distal end 646 of the rod 624 has a larger section than the neck portion 642. When assembled, the distal end 646 of the rod 624 is pressed through the opening 644 which slightly expands and then retracts around the neck portion 642 in a snap fit.

The supply conduit 620 has an upstream end that fits within a first mounting boss 650 positioned within the internal cavity 610 of the housing 602. A downstream end of the supply conduit 620 is fit over a second mounting boss 652 within the cavity 610. The diverter gate/seal 616 extends into the supply conduit 620 at a location between the upstream and downstream ends of the supply conduit 620. The distal end 646 of the rod 624 extends outwardly of the rod mount portion 632 to connect to the tab 640 of the diverter gate/seal 616.

An additional internal pipe 654 is then inserted into the upstream end of the supply conduit 620. At least one seal 656 is installed between the internal pipe 654 and the supply conduit 620 to provide a sealed connection. A set screw 658 is then used to connect the housing 602 to the internal pipe 654.

The diverter gate/seal 616 comprises a gate portion 660 that extends along a vertical length of the rod 624 and a finial/seal portion 662. The tab 640 is at the lower end of the gate portion 660. The finial/seal portion 662 comprises a cup-shaped extension portion with an opening 664 that receives water when in the diverting position (FIG. 7B). When in the non-diverting position (FIG. 7A) the opening 664 is blocked by the cap 628.

The supply conduit 620 defines a central axis A as shown in FIG. 7A. The cup-shaped extension portion of the diverter gate/seal 616 includes an upper portion and a lower portion. When the diverter gate/seal 616 is in the non-diverting position the lower portion is vertically above the central axis A to allow water to flow freely through the supply conduit 620 to exit at the spout outlet 614.

When the button 608 is pushed down, the rod 624 moves down, the spring 630 is compressed and the opening 664 of the diverter gate/seal 616 is aligned with the water supply opening 618 as shown in FIG. 7B. The water pushes and holds/seals the finial/seal portion 662 of the diverter gate/seal 616 against the rod mount portion 632 of the cap 628 when in the diverting position to prevent water from exiting the outlet 614. When the water is turned off, the water pressure decreases and the force of the spring 630 returns the button 608 to the non-diverting position shown in FIG. 6A.

While the above disclosure is drawn generally to a tub fixture, it should be understood that the principles illustrated can be applied to any plumbing fixture supplying fluid to two or more outlets. Further, the diverting mechanism of FIGS. 7A-7B could be used with the button embodiments shown in FIGS. 3A-3F, 4A-4B, and 5A-5B. Additionally, the diverting mechanism of FIGS. 2A-2B could be used with the button embodiment shown in FIGS. 6A-6B.

The disclosed invention provides a more accessible design utilizing a large button on top of the tub spout, which can be pressed using a first or flat hand to provide a downward force. By positioning the diverter gate at least partially above the water supply in the non-diverting position the subject invention provides a more accessible design that can be easily actuated by a user to divert a water supply to a secondary outlet.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tub spout with a diverter mechanism comprising:
   a housing providing an external surface and an internal cavity that includes a spout outlet;
   a water supply conduit located within the internal cavity, the water supply conduit providing a fluid path in fluid communication with the spout outlet;
   a push button extending outwardly of the external surface of the housing, the push button being movable relative to the housing between a non-diverting position where water exits the spout outlet and a diverting position where water is prevented from exiting the spout outlet;
   a diverter gate positioned within the internal cavity to selectively block the fluid path, wherein the diverter gate is coupled for movement with the push button; and
   a resilient member that biases the push button to the non-diverting position.

2. The tub spout according to claim 1 wherein the external surface comprises a lower surface that includes the spout outlet and an upper surface facing opposite the lower surface, and wherein the push button protrudes outwardly of the external surface when in the non-diverting position.

3. The tub spout according to claim 2 wherein the push button is generally flush with the external surface when in the diverting position.

4. The tub spout according to claim 1 wherein the diverter gate is positioned at least partially vertically above the fluid path of the water supply conduit when in the non-diverting position.

5. The tub spout according to claim 1 wherein the diverter gate is connected to a rod that is fixed for movement with the push button.

6. The tub spout according to claim 5 wherein the resilient member comprises a spring that surrounds the rod, and when a downward force is applied to the push button, the spring is compressed and the rod moves downward to lower the diverter gate to block the fluid path of the water supply conduit.

7. The tub spout according to claim 6 wherein, when the push button is in the diverting position and a water supply is turned on, the fluid path of the water supply conduit remains sealed due to a force of water pressure on the diverter gate, and when the water supply is shut off, the force due to water pressure on the diverter gate falls below a force attributed to the spring and the push button is reset to the non-diverting position.

8. The tub spout according to claim 5 including a rod mount portion that surrounds the rod and is held fixed relative to the housing, and wherein the rod extends from the push button to a distal end that extends outwardly of the rod mount portion and is coupled to the diverter gate.

9. The tub spout according to claim 8 wherein the rod mount portion is integral with or fixed directly to the housing.

10. The tub spout according to claim 9 including a mounting boss within the internal cavity that receives a downstream end of the supply conduit, and wherein the diverter gate is positioned axially between the rod mount portion and the mounting boss.

11. The tub spout according to claim 8 including a cap that is held fixed to the water supply conduit, and wherein the rod mount portion is integrally formed with or fixed directly to the cap.

12. The tub spout according to claim 11 wherein the supply conduit includes a mounting boss that includes an opening to receive the cap, and wherein the resilient member comprises a spring that reacts between the push button and the mounting boss.

13. The tub spout according to claim 1 wherein the diverter gate comprises a seal.

14. The tub spout according to claim 1 wherein the housing includes an upstream end and a downstream end, and wherein the push button is located at the downstream end, and wherein fluid is directed to a secondary outlet when in the diverting position.

15. The tub spout according to claim 1 wherein the housing includes an upstream end and a downstream end, and wherein the push button is centrally located on the housing between the upstream and downstream ends, and wherein fluid is directed to a secondary outlet when in the diverting position.

16. The tub spout according to claim 1 including a water pipe that is connected to the water supply conduit with at least one fastener.

17. The tub spout according to claim 1 wherein the water supply conduit defines a central axis, and wherein the diverter gate comprises a cup-shaped member having an upper portion and a lower portion that cooperate to block the fluid path, and wherein the lower portion is located vertically above the central axis when in the non-diverting position.

18. A tub spout with a diverter mechanism comprising:
    a housing providing an external surface and an internal cavity that includes a spout outlet;
    a water supply comprising a fluid path through the internal cavity and which is in fluid communication with the spout outlet;
    a push button extending outwardly of the external surface of the housing, the push button being movable relative to the housing between a non-diverting position where water exits the spout outlet and a diverting position where water is prevented from exiting the spout outlet; and
    a diverter gate positioned within the internal cavity to selectively block the fluid path, wherein the diverter gate is coupled for movement with the push button such that when the push button is pressed downward toward the housing, the diverter gate moves to the diverting position.

19. The tub spout according to claim 18 including a resilient member that biases the push button to the non-diverting position, and wherein fluid is directed to a shower head when the button is pushed to the diverting position.

20. The tub spout according to claim 19 wherein the diverter gate is connected to a rod that is fixed for movement with the push button, and wherein the diverter gate is positioned at least partially vertically above the fluid path of the water supply when in the non-diverting position, and wherein the resilient member comprises a spring that surrounds the rod, and when a downward force is applied to the push button, the spring is compressed and the rod moves downward to lower the diverter gate to block the fluid path of the water supply.

* * * * *